United States Patent [19]

Matsukawa

[11] Patent Number: 5,436,436
[45] Date of Patent: Jul. 25, 1995

[54] IC CARD CONTROLLED SYSTEM FOR SELECTING A LANGUAGE FOR A VISUAL MESSAGE DISPLAY

[75] Inventor: Takanari Matsukawa, Tokyo, Japan

[73] Assignee: NEC Corporation, Japan

[21] Appl. No.: 73,733

[22] Filed: Jun. 8, 1993

[30] Foreign Application Priority Data

Jun. 11, 1992 [JP] Japan ................................. 4-177629

[51] Int. Cl.⁶ ...................................... G06F 3/00
[52] U.S. Cl. ................................... 235/380; 379/144
[58] Field of Search ................ 235/380, 379; 379/144, 379/357

[56] References Cited

U.S. PATENT DOCUMENTS 4,319,336  3/1982  Anderson ........................... 235/380
4,736,405  4/1988  Akiyama ............................ 379/357

FOREIGN PATENT DOCUMENTS 0399360  5/1990  European Pat. Off. .
0499211  8/1992  European Pat. Off. .
58-82365  8/1983  Japan .
63-83863  4/1988  Japan .
2-162487  6/1990  Japan .
2162487  9/1990  Japan .
2-279392  9/1992  Japan .

OTHER PUBLICATIONS

Patent Abstracts of Japan, vol. 11, No. 366, (P-641) Nov. 1987, Abstract of 62-139072, Jun. 22, 1987.

*Primary Examiner*—F. L. Evans
*Attorney, Agent, or Firm*—Laff, Whitesel, Conte & Saret, Ltd.

[57] ABSTRACT

According to the present invention, an IC card terminal apparatus includes an IC card, an interface unit, a reading unit, a display control unit, and a display unit. Language identification information indicating a type of a language is stored in the IC card. The interface unit interfaces with the IC card. The reading unit reads out the language identification information from the IC card through the interface unit when the IC card is connected to the interface unit. The display control unit controls display of a message expressed in a language indicated by the language identification information read out by the reading unit. The display unit displays a message in a language indicated by an output from the display control unit.

1 Claim, 5 Drawing Sheets

IC CARD CONTROLLED SYSTEM FOR SELECTING A LANGUAGE FOR A VISUAL MESSAGE DISPLAY

BACKGROUND OF THE INVENTION

The present invention relates to an IC card terminal apparatus capable of realizing various functions by inserting an IC card held by a user and to an IC card used in the apparatus.

An IC card terminal apparatus such as an IC card telephone apparatus can be used by inserting an IC card, in which individual information of a card holder is stored, into the apparatus main body. The IC card terminal apparatus generally comprises an IC card interface, a control unit, and a display unit, exchanges data with the IC card through the IC card interface, and displays a message such as guidance to a user on the display unit as needed.

In a conventional IC card terminal apparatus, a language of a message displayed on the display unit is fixed in accordance with the specification of the apparatus. For example, a message is displayed in Japanese in an IC card terminal apparatus installed in Japan, a message is displayed in English in an IC card terminal apparatus installed in the United States of America, and a message is displayed in German in an IC card terminal apparatus installed in Germany.

In the conventional IC card terminal apparatus, as described above, a language of a message is fixed. Therefore, when a message for guidance or the like is displayed on an IC card terminal apparatus to be used in a language which cannot be understood by a card holder, the user cannot smoothly use the IC card terminal apparatus. In addition, the specifications of IC card terminal apparatuses must be changed depending on countries in which the apparatus are installed, general-purpose apparatuses cannot be exported, and low-cost apparatuses cannot be obtained.

SUMMARY OF THE INVENTION

It is an object of the present invention to provide an IC card terminal apparatus which can be smoothly used regardless of its location and an IC card used in the apparatus.

It is another object of the present invention to provide a low-cost IC card terminal apparatus and an IC card used in the apparatus.

In order to achieve the above objects, according to the present invention, there is provided an IC card terminal apparatus comprising an IC card in which language identification information indicating a type of language is stored, interface means for interfacing with the IC card, reading means for reading out the language identification information from the IC card through the interface means when the IC card is connected to the interface means, display control means for controlling display of a message expressed in a language indicated by the language identification information read out by the reading means, and display means for displaying a message in a language indicated by an output from the display control means.

DESCRIPTION OF THE PREFERRED EMBODIMENT

Figure 1:
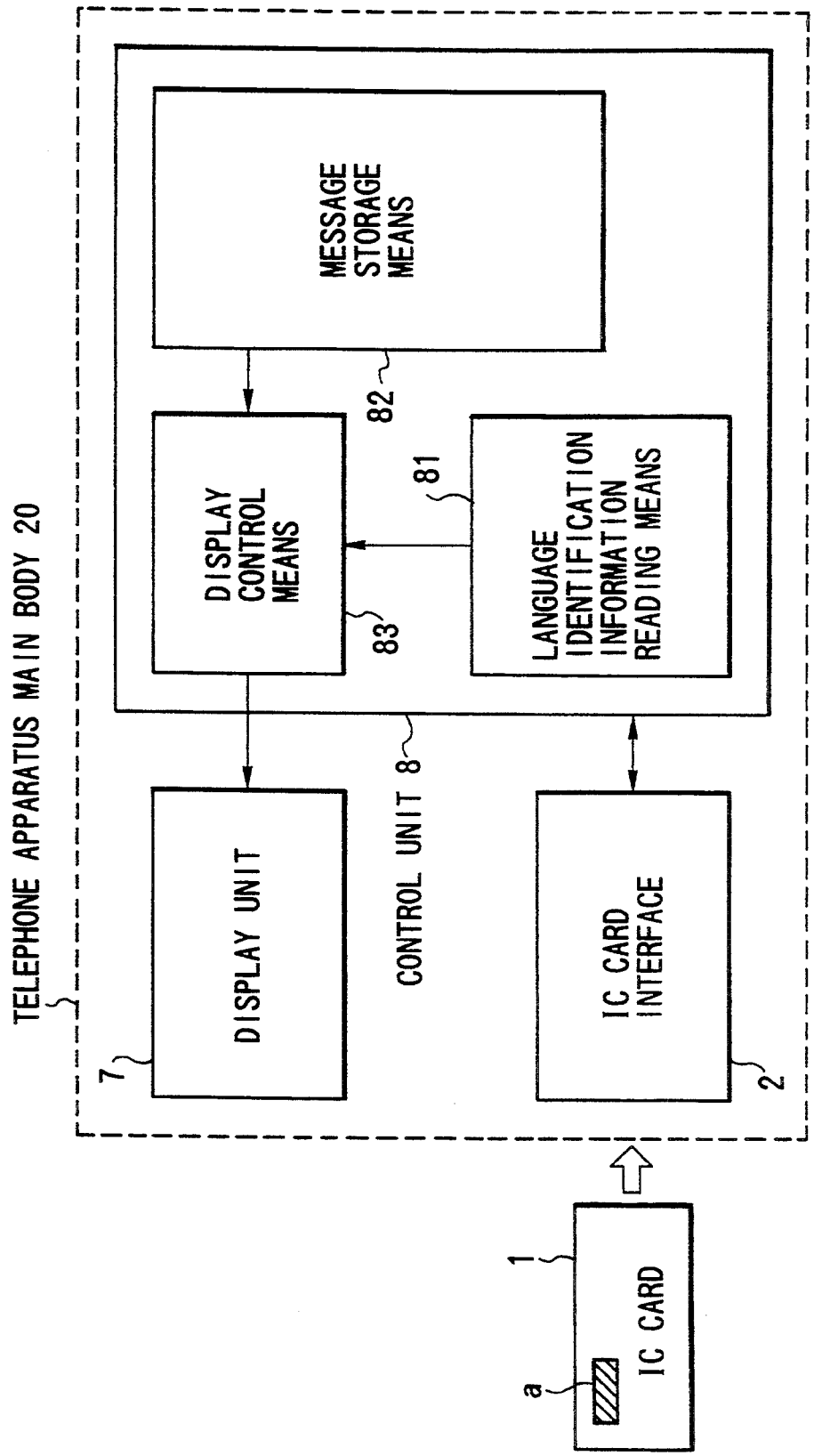
FIG. 1 is a block diagram of a basic function of an IC card terminal apparatus according to the present invention.
Figure 2:
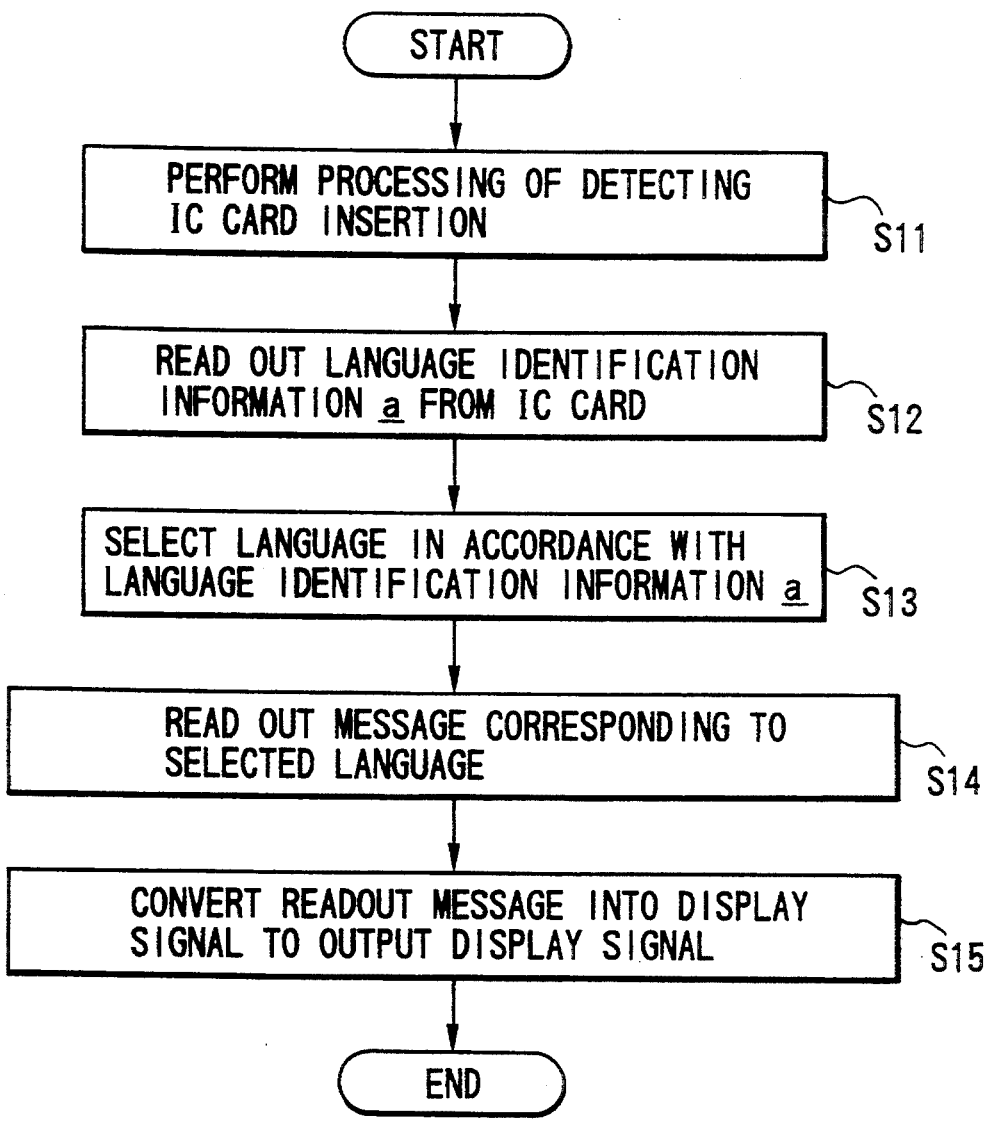
FIG. 2 is a schematic flow chart showing an operation of a control unit 8 in FIG. 1.

FIG. 1 shows a basic function of an IC card terminal apparatus according to the present invention. Referring to FIG. 1, reference numeral 1 denotes an IC card in which language identification information a is stored; and 20, a terminal apparatus main body for realizing various functions including outgoing call and speech communication functions by inserting an IC card 1 into the terminal apparatus main body. The terminal apparatus main body 20 is constituted by an IC card interface 2 such as an IC card reader/writer, a display unit 7 such as a liquid crystal display, and a control unit 8 for controlling the overall terminal apparatus. The control unit 8 is constituted by a language identification information reading means 81 for reading out language identification information a stored in the IC card 1 connected to the IC card interface 2, a message storage means 82 for storing messages to be displayed on the display unit for a plurality of languages, and a display control means 83 for, when a message is to be displayed on the display unit 7, picking a message corresponding to a language indicated by the language identification information a read out by the language identification information reading means 81 to cause the display unit 7 to display the message.

The outline of an operation of the IC card terminal apparatus arranged as described above will be described below by using the flow chart of the control unit 8. First, language identification information a indicating a type of language which can be understood by a card holder is stored in the IC card 1 in advance. When the card holder inserts the IC card 1 into the terminal apparatus main body 20, the language identification information reading means 81 detects the insertion of the card (step S11), and reads out the language identification information a stored in the IC card 1 through the IC card interface 2 (step S12). When a message is to be displayed on the display unit 7, the display control means 83 of the control unit 8 selects a language indicated by the language identification information a from languages of messages stored in the message storage means 82 (step S13). The display control means 83 reads out a message corresponding to the selected language from the messages stored in the message storage means 82 (step S14), and the readout message is converted into a display signal to be output to the display unit 7 (step S15). In this manner, the display unit 7 displays the message corresponding to the indicated language.

Figure 3:
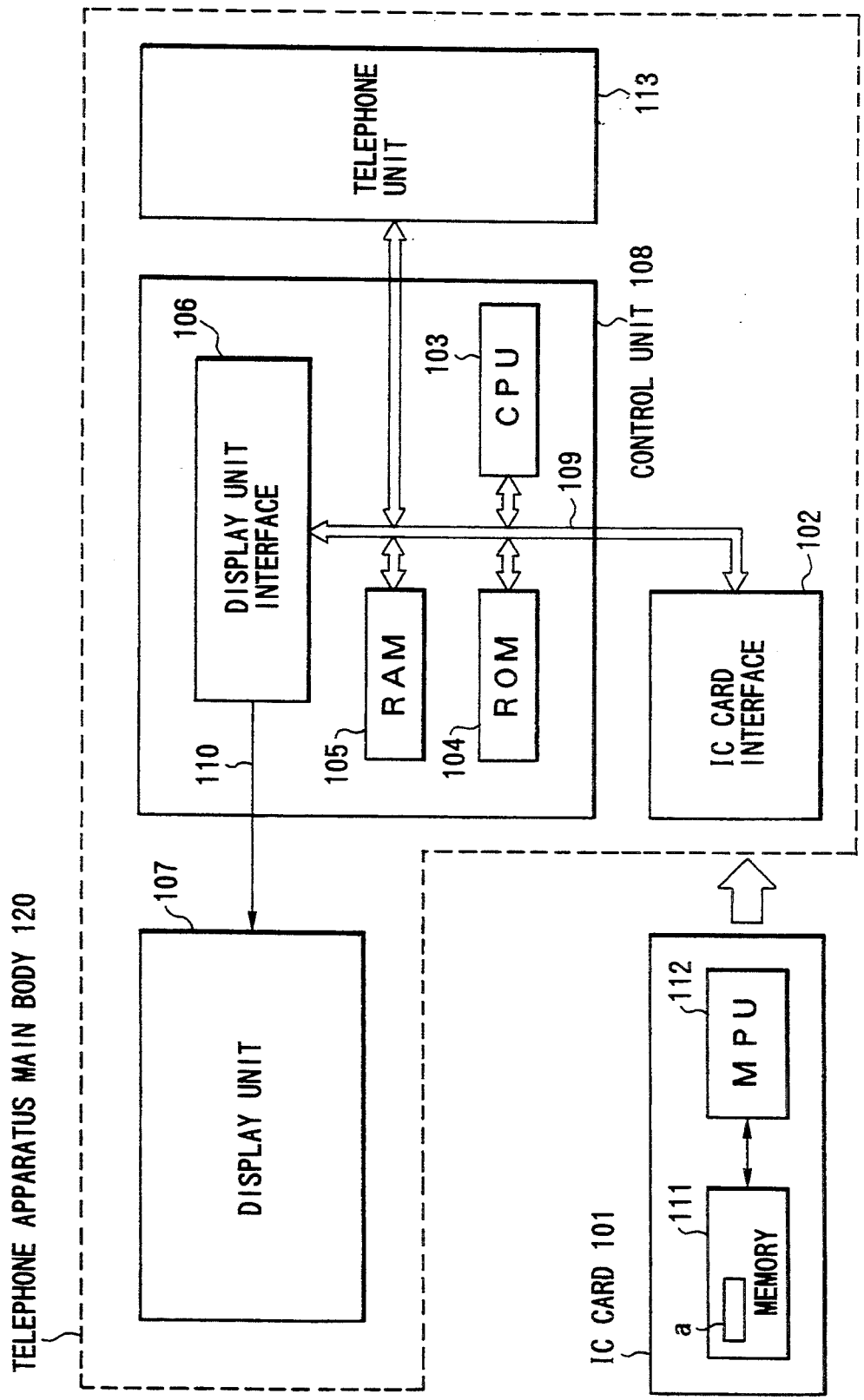
FIG. 3 is a block diagram showing a stored-program type IC card telephone apparatus according to an embodiment of the present invention.

FIG. 3 shows an embodiment wherein a stored-program type IC card telephone apparatus is used as an IC card terminal apparatus. Reference numeral 101 denotes an IC card in which language identification information a is stored; and 120, a telephone apparatus main body for realizing various functions including outgoing call and speech communication functions by inserting the IC card 101 into the telephone apparatus. The telephone apparatus main body 120 is constituted by an IC card interface 102 such as an IC card reader/writer, a display unit 107 such as a liquid crystal display, a control unit 108 for controlling the overall telephone apparatus, and a telephone unit 113 controlled by the control unit 108 and having a telephone line interface, a handset, a speech communication circuit, input keys, and the like (none of them are shown).

Figure 6:
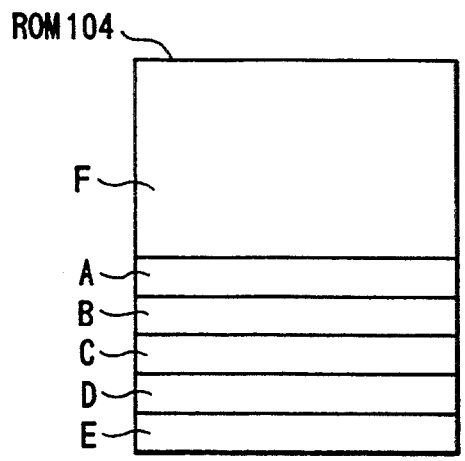
FIG. 6 is a view showing allocation of the memory area of a ROM 104 in FIG. 3.

The control unit 108 comprises a CPU (Central Processing Unit) 103, a ROM (Read-Only Memory) 104, a RAM (Random Access memory) 105, and a display unit interface 106. The CPU 103, the ROM 104, the RAM 105, the display unit interface 106, the IC card interface 102, and the telephone unit 113 are connected to each other through a bus 109, and the display unit interface 106 is connected to the display unit 107 through a signal line 110. The CPU 103 controls communication with the CPU 103, the display unit 107, the telephone unit 113, and the like, thereby controlling the overall telephone apparatus. The ROM 104 stores a program to be executed by the CPU 103 and a plurality of messages to be displayed on the display unit 107 for a plurality of languages. For example, if the number of languages is 5, one message is stored in five languages. In addition, when the number of types of messages is 10, as shown in FIG. 6, 10 types of messages are stored in each of five memory areas A to E for a plurality of languages, i.e., a total of 50 messages are stored. Reference symbol F denotes a program area. The RAM 105 is used for temporarily holding data and the like in a process wherein the CPU 103 performs processing, and the display unit interface 106 controls the interface between the display unit interface 106 and the display unit 107.

The IC card 101 to be inserted into the above telephone apparatus main body 120 comprises a memory 111 such as an EEPROM (Electrical Erasable and Programmable ROM) and an MPU (Micro Processor) 112 for read/write-controlling the memory 111 and performing communication with the CPU 103. In addition to the ID number, charge information, and a password number of a card holder, language identification information a indicating the type of language which can be understood by the card holder are stored in the memory 111 in advance. This language identification information a indicates one of a plurality of languages for expressing messages stored in the ROM 104.

Figure 4:
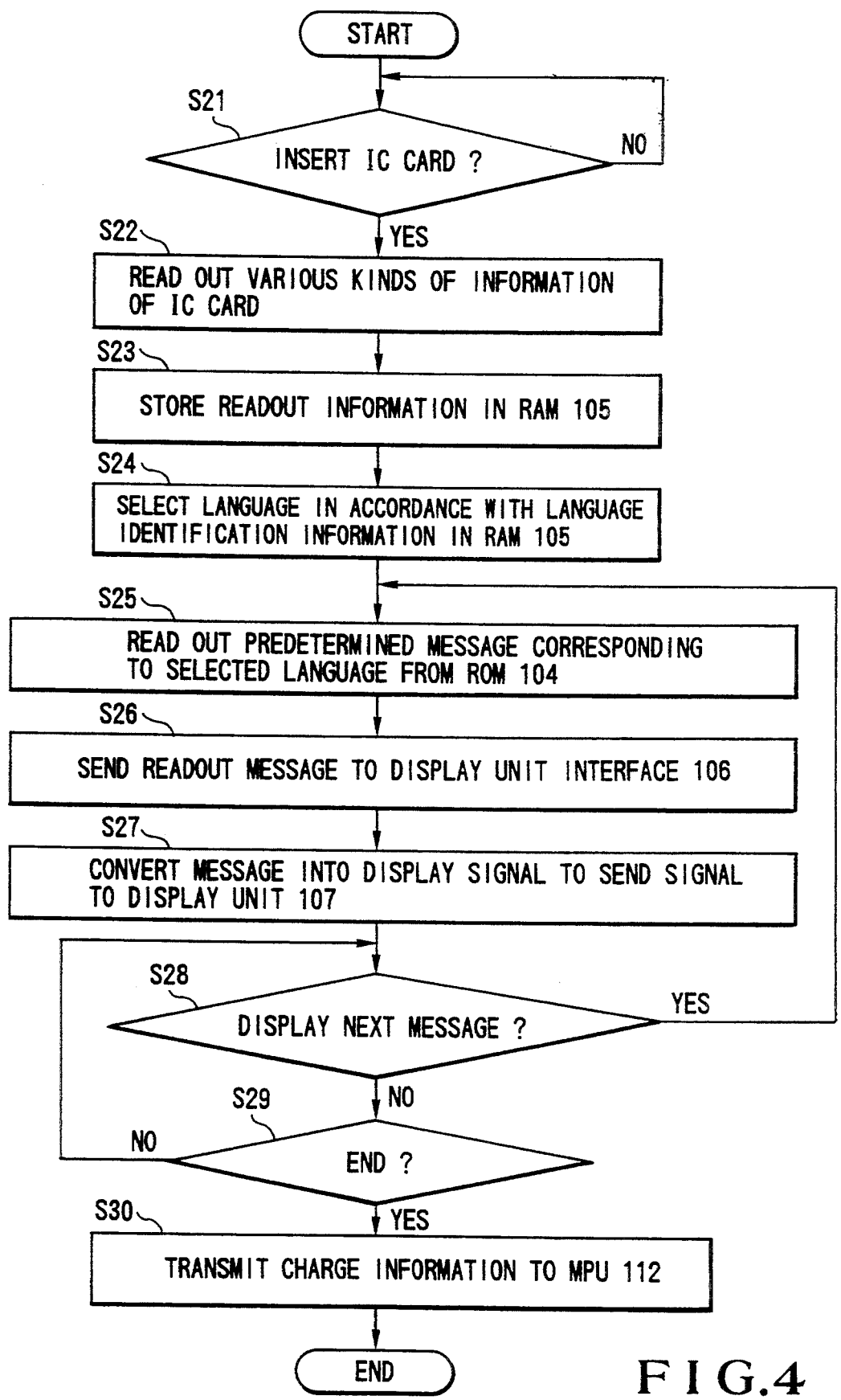
FIG. 4 is a flow chart of a CPU 103 in FIG. 3.

An operation of the IC card telephone apparatus arranged as described above will be described below by using the flow chart of the CPU 103 shown in FIG. 4 and the flow chart of the MPU 112 shown in FIG. 5. In FIG. 4, when the IC card 101 is inserted into the telephone apparatus main body 120 and connected to the IC card interface 102, and the CPU 103 detects the insertion of the IC card 101 (step S21), the CPU 103 communicates with the MPU 112 of the IC card 101 through the IC card interface 102 to read out various kinds of information such as language identification information a, an ID number, and a password number from the memory 111 (step S22), and the readout information are transferred to the RAM 105 to be stored in the RAM 105 (step S23). The information stored in the RAM 105 is cleared when the IC card is removed from the telephone apparatus main body 120.

The CPU 103 reads out the language identification information a stored in the RAM 105 to cause the display unit 107 to display messages such as a method of using the IC card telephone apparatus and select a language indicated by the language identification information a from the languages of the messages stored in the ROM 104 (step S24). A message corresponding to the selected language is read out from the messages stored in the ROM 104 for each language (step S25), the readout message is sent to the display unit interface 106 (step S26). The display unit interface 106 converts the input message into a display signal to send the display signal to the display unit 107 (step S27). In this manner, the message expressed in a language which can be understood by a card holder is displayed by the display unit 107. For example, when a message which means "please input password number" is displayed, the message expressed in Japanese is read out from the ROM 104 to be displayed on the display unit 107 when the language identification information a indicates Japanese. Similarly, the message expressed in English is read out from the ROM 104 to be displayed on the display unit 107 when the language identification information a indicates English, and the message expressed in German is read out from the ROM 104 to be displayed on the display unit 107 when the language identification information a indicates German.

When another message must be displayed (step S28), the flow returns to step S25, and a predetermined message corresponding to the selected language is read out from the ROM 104 to be displayed on the display unit 107. This operation is repeated. When the end of the operation of the apparatus is determined by an on-hook operation (step S29), charge information and the like are transmitted to the MPU 112 (step S30).

When the memory area is prepared in the ROM 104 for each language as described above, a corresponding memory area, e.g., a memory area A shown in FIG. 6, is selected in selection of a language in displaying the first message, and the start address of the memory area A is held until the IC card 101 is removed. For this reason, in displaying the second and subsequent messages, a desired message is only read out from the memory area A which is selected first. Therefore, the CPU 103 need not refer to the type of selected language or language identification information a every time a message is to be displayed.

Figure 5:
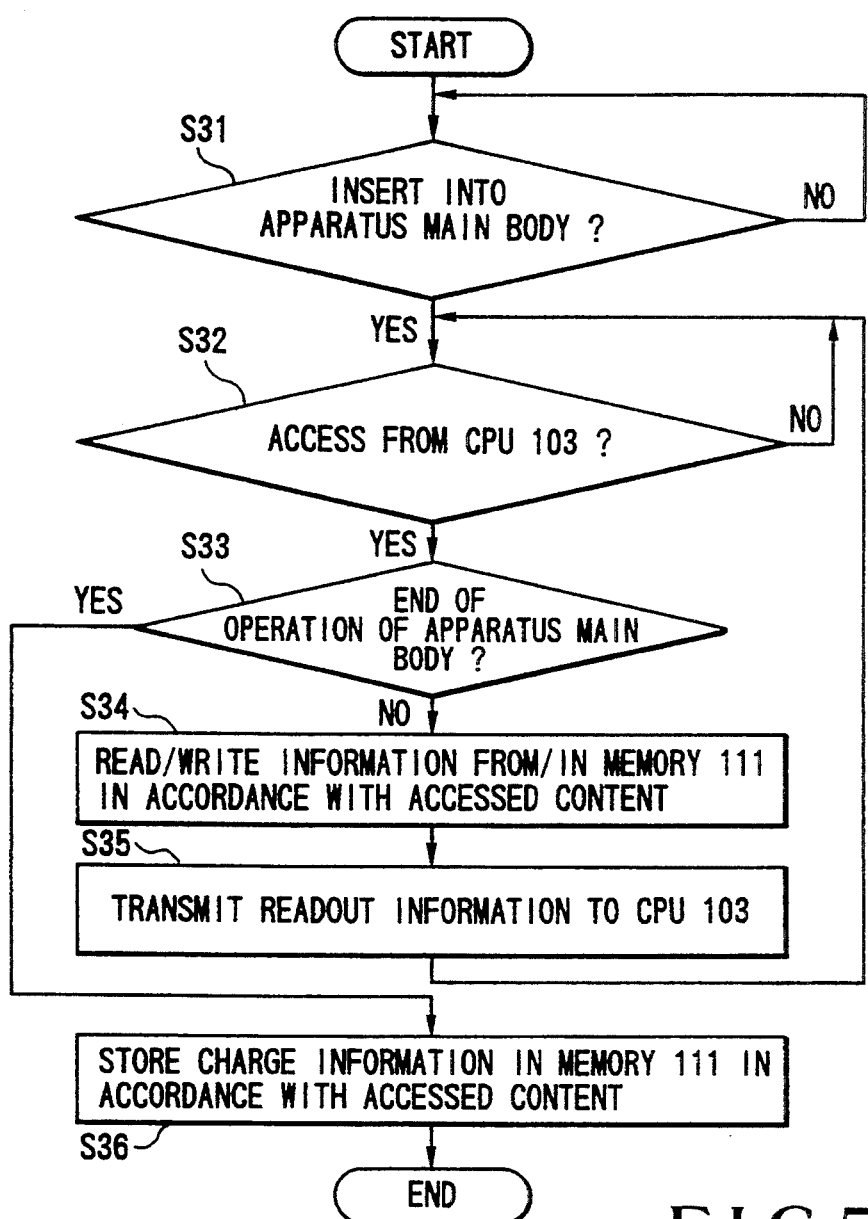
FIG. 5 is a flow chart of an MPU 112 in FIG. 3.

The MPU 112 of the IC card 101, as shown in FIG. 5, detects the IC card 101 (step S31) when the IC card 101 is inserted into the telephone apparatus main body 120, and the MPU 112 waits for access from the CPU 103 of the telephone apparatus main body 120. When a transfer request from the CPU 103 is accessed (steps S32 and S33), the MPU 112 reads/writes information in the memory 111 in accordance with the accessed content (step S34), and pieces of readout information, i.e., various kinds of information including language identification information a to be stored in the RAM 105 are transmitted to the CPU 103 of the telephone apparatus main body 120 (step S35). Subsequently, if there is a transfer request from the CPU 103, the above transfer operation is repeated. If the operation of the telephone apparatus main body 120 is finished (step S33), charge information and the like transmitted from the CPU 103 are stored in the memory 111 (step S36).

In this manner, when language identification information a indicating a language, among the languages of the messages stored in the ROM 104, which can be understood by the holder of the IC card 101 through the MPU 112 is stored in the memory 111 of the IC card 101 in advance, a message is displayed in the language indicated by the language identification information a regardless of a country in which the telephone apparatus main body 120 is installed, and the content of the message can reliably be understood by the user. For example, when an IC card telephone apparatus according to the present invention is installed in Germany, language identification information a indicating German is stored in an IC card, and messages are normally displayed in German in the IC card telephone apparatus. When the IC card 101 which is used in Japan and in which language identification information a indicating Japanese is stored is used in the IC card telephone apparatus installed in Germany, the CPU 103 of the telephone apparatus main body 120 reads out the language identification information a from the inserted IC card 101, and the CPU 103 determines that the messages are displayed in Japanese. For this reason, messages are displayed automatically in Japanese in the IC card telephone apparatus. The IC card telephone apparatus can be used by a user who cannot understand German because a message representing "please input password number" or a message representing "please receive IC card" is displayed in Japanese upon an on-hook operation.

As has been described above, in an IC card terminal apparatus according to the present invention, messages are displayed in a language which can be understood by a card holder. For this reason, a user can smoothly use, at ease, the IC card terminal apparatuses installed in countries other than user's country, and the utilization of the IC card terminal apparatus can be enhanced. In addition, general-purpose IC card terminal apparatuses common to all languages can be exported to realize low-cost apparatuses.

What is claimed is:

1. An IC card controlled system for a telephone terminal apparatus, said telephone apparatus having a visual message display comprising:

an IC card having stored thereon language identification information indicating a language the language indicated by said information identification being applicable in an area where any of a plurality of different languages might be used to make said visual message display;

interface means in said telephone apparatus for interfacing with said IC card;

reading means in said telephone apparatus for reading out the language identification information from said IC card through said interface means when said IC card is coupled into said interface means;

display control means in said telephone apparatus for controlling a display of a message expressed in one of said languages which is indicated by the language identification information read out by said reading means;

display means in said telephone apparatus for visually displaying a message in said one language in response to an output from said display control means;

message storage means for pre-storing messages to be displayed on said display means in each of said plurality of languages, so that said display control means reads out from said message storage means a pre-stored message in said one language indicated by the language identification information stored on said IC card;

said message storage means comprising a plurality of memory areas for respectively storing a plurality of messages in a plurality of languages; and said display control means selecting one of the memory areas in accordance with the language identification information and reading out a desired message from the selected memory area to perform display control.

* * * * *